3,201,403
3 ALKOXY-SUBSTITUTED-N LOWER ALKANOYL MORPHINANS
Yoshiro Sawa, Hyogo Prefecture, and Naoki Tsuzi and Haruhiko Tada, Osaka Prefecture, Japan, assignors to Shionogi & Co., Ltd., Osaka, Japan
No Drawing. Filed Apr. 3, 1963, Ser. No. 270,186
Claims priority, application Japan, Apr. 6, 1962, 37/14,060, 37/14,061
7 Claims. (Cl. 260—285)

The present invention relates to morphinan derivatives and production thereof.

In the term "morphinan" herein employed, there are included all the compounds having the fundamental structure representable by the following plane formula:

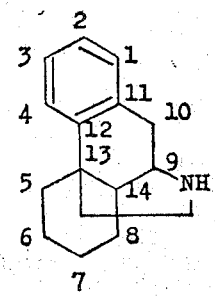

Accordingly, the term "morphinan" means not only normal morphinan (cis-1,3,4,9,10,10a-hexahydro-2H-10,4a-iminoethanophenanthrene) but also isomorphinan (trans-1,3,4,9,10,10a-hexahydro - 2H - 10,4a-iminoethanophenanthrene), inclusively. When distinction is necessary, normal morphinan and isomorphinan will be hereinafter designated as "morphinan (cis)" and "morphinan (trans)," respectively. The position-numbering hereinafter employed for the morphinan derivatives is that generally accepted in morphinan chemistry as shown in the above plane formula.

The objective morphinan derivative in the present invention is representable by the following plane formula:

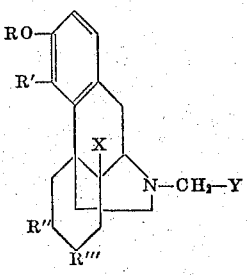

wherein R represents a lower alkyl group (e.g., methyl, ethyl, propyl), R' represents a hydrogen atom, an aryloxy group (e.g., phenyloxy, naphthyloxy) or a substituted aryloxy group (e.g., substituted phenyloxy, substituted naphthyloxy) wherein the substituent is lower alkyl (e.g., methyl, ethyl, propyl), lower alkoxy (e.g., methoxy, ethoxy, propoxy), nitro or amino, R'' and R''' each represents a methylene group, a hydroxymethylene group, a carbonyl group or a ketalated carbonyl group (e.g., ethyl- enedioxymethylene, diethoxymethylene), X represents a hydrogen atom or a hydroxyl group and Y represents a lower alkyl group (e.g., methyl, ethyl, propyl), an aryl group (e.g., phenyl, naphthyl) or an ar(lower)alkyl group (e.g., benzyl, phenethyl) and shows various pharmacological activities such as analgesic activity, antitussive activity and antiinflammatory activity.

Accordingly, a basic object of the present invention is to embody the morphinan derivative of Formula I. Another object of the invention is to embody the pharmacologically active N-substituted morphinan (I). A further object of the invention is to embody a process for preparing the N-substituted morphinan (I). These and other objects will be apparent to those conversant with the art to which the present invention pertains from the subsequent description.

The process of the present invention is illustratively represented by the following scheme:

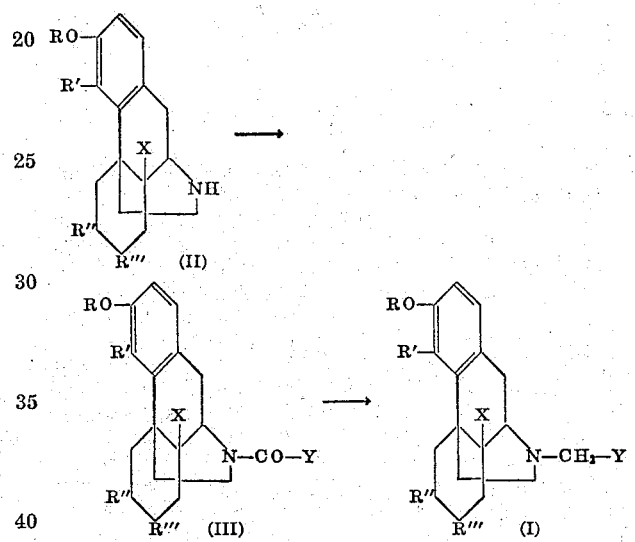

wherein R, R', R'', R''', X and Y each has the same significance as designated above.

As the starting material, there may be used the optically active or racemic morphinan of Formula II.

According to the process of the present invention, the starting morphinan (II) is subjected to acylation, followed by reduction of the resultant N-acylmorphinan (III) to the objective N-substituted morphinan (I). The acylation can be accomplished by treating the morphinan (II) with a conventional acylating agent represented by the formula: Z—CO—Y wherein Y has the same significance as designated above and Z represents a reactive residue of the functional acid derivatives, preferably acid anhydride (e.g., acetic anhydride, propionic anhydride, butyric anhydride) or acid halide (e.g., acetyl chloride, propionyl chloride, butyryl chloride, benzoyl chloride, naphthoyl chloride, phenacetyl chloride, phenacetyl bromide) at a temperature from room temperature (15 to 30° C.) to reflux temperature. If necessary, an inert organic solvent (e.g., benzene, toluene, acetone, dioxane, tetrahydrofuran) may be used as the reaction medium. The addition of an inorganic or organic base (e.g., sodium carbonate, potassium carbonate, pyridine, picoline, dimethylaniline) as a condensing agent may afford good results. In the acylation reaction, any group which can react with the said acylating agent as the 14-hydroxyl group may be simultaneously acylated. However, the intended N-acylation is not blocked by this side reaction. The subsequent reduction can be effected by treating the resulting N-acylmorphinan (III) with a metallic hydride complex (e.g., lithium aluminum hydride, sodium borohydride) in an inert solvent medium. The solvent may be properly selected depending on the property of the N-acylmorphinan (III) and the reducing agent. Illustrative solvents include water, methanol, ethanol, ether, tetrahydrofuran and dioxane. The reaction can proceed at room temperature (15 to 30° C.), but heating so as to reflux is usually preferred. In the reduction reaction, any reducible group as the 6-oxo group may be simultaneously reduced. However, the intended reduction of the carbonyl group in the N-acyl group is not inhibited by this side reaction. Moreover, the reducible group may be previously protected in a per se conventional manner, when the simultaneous reduction of the same is unfavorable.

The objective N-substituted morphinan (I) occurs in optically active form as well as in racemic mixture and these are all within the scope of the present invention.

The N-substituted morphinan (I) forms acid addition salts with organic and inorganic acids. Illustrative acid addition salts include the hydrohalide (e.g., hydrochloride, hydrobromide, hydroiodide), sulfate, phosphate, nitrate, tartrate, salicylate, benzoate, malate, citrate, acetate, etc.

The thus-produced N-substituted morphinan (I) and acid addition salts thereof exhibit various pharmacological activities such as analgesic activity, antitussive activity and antiinflammatory activity. For instance, the analgesic activity and the toxicity of some N-substituted morphinans according to the present invention are shown in the following Table I:

TABLE I

| Compound | Analgesic activity | | Toxicity (mg./kg.) |
|---|---|---|---|
| | Haffner-Hesse method | D'Amour-Smith method | |
| (−)-3-Methoxy-N-phenethyl-morphinan (cis) tartrate | 1.7 | 5 | 65 |
| (−)-3-Hydroxy-N-phenethyl-morphinan (cis) hydrobromide | 15 | 50 | |
| (−)-3-Methoxy-6-oxo-14-hydroxy-N-phenethylmorphinan (cis) | 5.7 | 10.3 | >1000 |

NOTE.—The analgesic activity was observed by the Haffner-Hesse method [Hesse: Arch. exp. Path. u. Pharm., vol. 158, p. 233 (1930)] in mice and the D'Amour-Smith method [D'Amour et al.: J. Pharmacol., vol. 1, p. 255 (1946)] in rats and is shown as the effective ratio to morphine, the value of which is expressed as 1. The toxicity was tested by the intravenous administration of the tested compound to mice and is shown by LD50 (lethal dose).

Further, for instance, the antitussive activity and the toxicity of some N-substituted morphinans according to the present invention are shown in the following Table II:

TABLE II

| Compound | Antitussive activity | Toxicity (mg./kg.) |
|---|---|---|
| (+)-3-Methoxy-N-ethylmorphinan (cis) hydrobromide | 0.7 | 40.9 |
| (−)-3-Methoxy-N-ethylmorphinan (cis) hydrobromide | 1.4 | 41.7 |
| (−)-3-Hydroxy-N-ethylmorphinan (cis) hydrobromide | 2.4 | 60.8 |
| (−)-3-Methoxy-N-phenethylmorphinan (cis) tartrate | 2.7 | 65 |

NOTE.—The antitussive activity was observed by the Winter method [Winter et al.: J. Exper. Med., vol. 101, p. 17 (1955)] in guinea pigs and is shown as the effective ratio to codeine, the value of which is expressed as 1. The toxicity was tested by the intravenous administration of the tested compound to mice and is shown by LD50 (lethal dose).

Accordingly, they are useful as analgesic, antitussive and/or antiinflammatory agents.

Practical and presently preferred embodiments of the present invention are illustrated by the following examples. In the examples, abbreviations each have conventional meanings, e.g. mg.=milligram(s), g.=gram(s), ml.=millilitre(s), ° C.=degrees centigrade.

*Example 1*

Preparation of (+)-3-methoxy-4-phenyloxy-N-ethylmorphinan (cis):

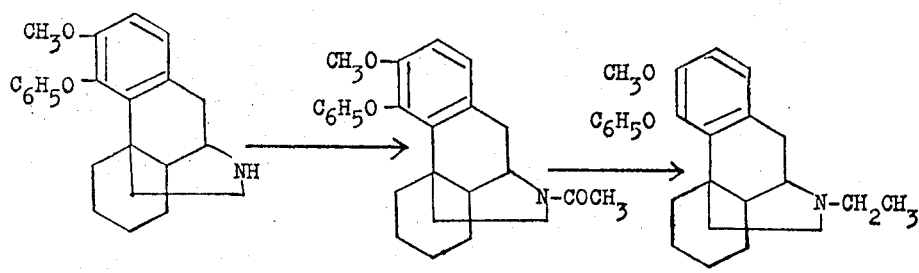

A solution of (+)-3-methoxy-4-phenyloxymorphinan (cis) (0.94 g.) in acetic anhydride (2 ml.) is heated on a water bath for 15 minutes and then acetic anhydride removed by distillation. The residue is mixed with water and shaken with ether. The ether extract is chromatographed on alumina to eliminate impurities. The resultant ether solution is evaporated to give (+)-3-methoxy-4-phenyloxy-N-acetylmorphinan (cis) (0.92 g.) as an oil.

A solution of (+)-3-methoxy-4-phenyloxy-N-acetylmorphinan (cis) (2.0 g.) prepared above in anhydrous ether (50 ml.) is dropwise added to a solution of lithium aluminum hydride (0.78 g.) in anhydrous ether (500 ml.) while stirring. The resultant mixture is refluxed for 5 hours while stirring. After decomposition of excess of lithium aluminum hydride with water, the ether layer is separated and shaken with dilute hydrochloric acid. The hydrochloric acid layer is made to alkalinity with sodium hydroxide and shaken with ether. The ether layer is separated and chromatographed on alumina to eliminate impurities. The resulting ether solution is evaporated to give (+)-3-methoxy-4-phenyloxy-N-ethylmorphinan (cis) (1.71 g.) as an oil. The oil is treated with hydrobromic acid and crystallized from water to give (+)-3-methoxy-4-phenyloxy-N-ethylmorphinan (cis) hydrobromide as crystals melting at 257 to 260° C. (decomp.). $[\alpha]_D^{26}$ +7.2° (ethanol).

*Analysis.*—Calcd. for $C_{25}H_{31}O_2N \cdot HBr \cdot H_2O$: C, 63.02; H, 7.19; N, 2.94; Br, 16.77. Found: C, 62.73; H, 7.42; N, 2.94; Br, 16.83.

The starting material of this example, (+)-3-methoxy- 4-phenyloxymorphinan (cis), is prepared from (+)-3-methoxy-4-phenyloxy-N-methylmorphinan (cis) [Sawa et al.: Tetrahedron, vol. 15, p. 144 (1961)] according to the following scheme:

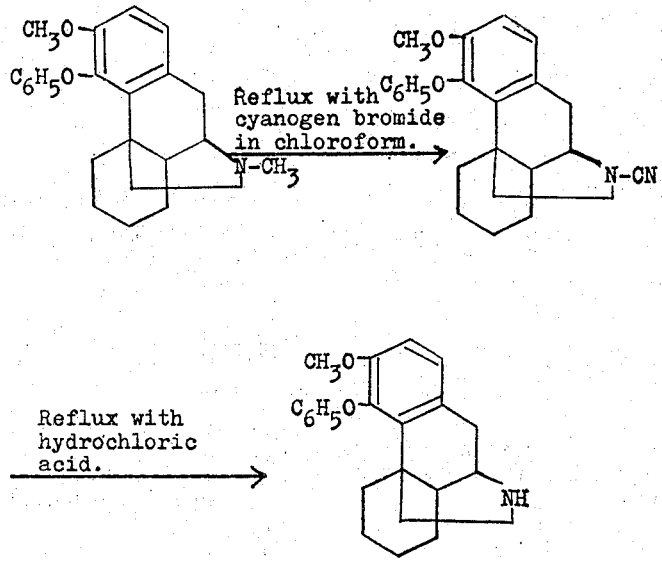

Example 2

Preparation of (+)-3-methoxy-4-phenyloxy-N-phenethylmorphinan (cis):

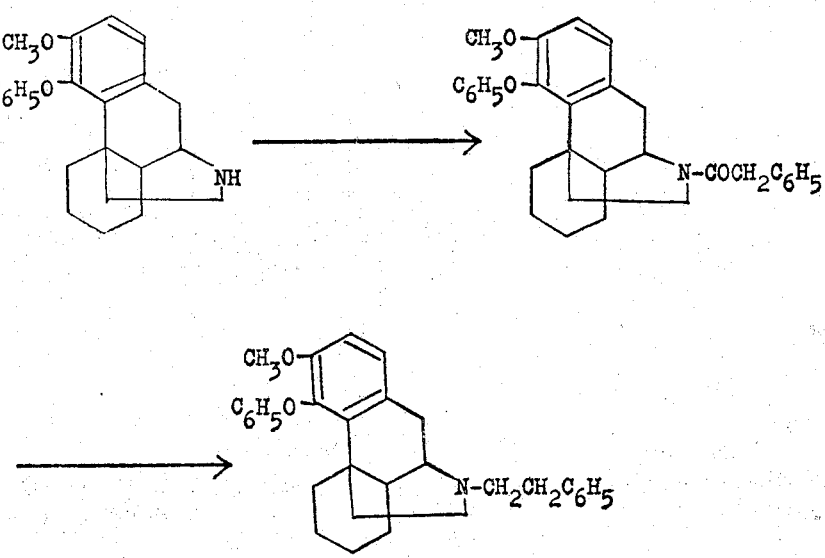

A solution of (+)-3-methoxy-4-phenyloxymorphinan (cis) (1.7 g.) and phenacetyl chloride (1.2 ml.) in benzene (10 ml.) is refluxed for 1.5 hours. The reaction mixture is washed with water, dilute hydrochloric acid and aqueous sodium hydroxide and chromatographed on alumina to eliminate impurities. The resultant benzene solution is evaporated to give (+)-3-methoxy-4-phenyloxy-N-phenacetylmorphinan (cis) (2.0 g.) as an oil.

A solution of (+)-3-methoxy-4-phenyloxy-N-phenacetyl-morphinan (cis) (1.4 g.) prepared above in anhydrous ether (40 ml.) is dropwise added to a solution of lithium aluminum hydride (0.31 g.) in anhydrous ether (30 ml.), and the resultant mixture is refluxed for 5 hours. After decomposition of excess of lithium aluminum hydride with water, the ether layer is separated and shaken with dilute hydrochloric acid. The hydrochloric acid layer is made to alkalinity with sodium hydroxide and shaken with ether. The ether layer is separated and chromatographed on alumina to eliminate impurities. The resulting ether solution is evaporated and crystallized from ethanol whereby (+)-3-methoxy-4-phenyloxy-N-phenethylmorphinan (cis) (1.1 g.) is obtained as crystals melting at 140 to 142° C. $[\alpha]_D^{29}+82.8°$ (chloroform).

*Analysis.*—Calcd. for $C_{31}H_{35}O_2N$: C, 82.08; H, 7.78; N, 3.09. Found: C, 81.67; H, 8.01; N, 3.17.

Example 3

Preparation of (+)-3-methoxy-N-ethylmorphinan (cis):

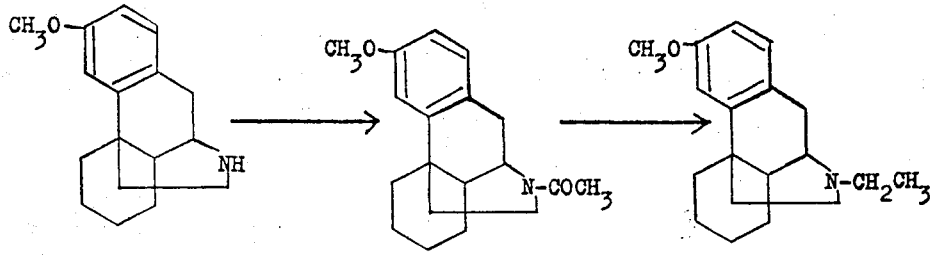

A solution of (+)-3-methoxymorphinan (cis) (2.85 g.) in acetic anhydride (1.5 ml.) is heated on a water bath for 1 hour. The reaction mixture is combined with water and acetic acid removed by distillation. The resulting substance is dissolved in benzene, washed with aqueous sodium hydroxide, dilute hydrochloric acid and water in order and the solvent removed to give (+)-3-methoxy-6-acetylmorphinan (cis) (3.06 g.) as an oil.

A solution of (+)-3-methoxy-N-acetylmorphinan (cis) (3.0 g.) prepared above in anhydrous ether (70 ml.) is dropwise added to a solution of lithium aluminum hydride (1.52 g.) in anhydrous ether (80 ml.) while stirring, and the resultant mixture is refluxed for 5 hours. After decomposition of excess of lithium aluminum hydride with water, the ether layer is separated and shaken with dilute hydrochloric acid. The hydrochloric acid layer is made to alkalinity with sodium hydroxide and shaken with ether. The ether layer is separated and chromatographed on alumina to eliminate impurities. The resulting ether solution is evaporated to give (+)-3-methoxy-N-ethylmorphinan (cis) (2.64 g.), which is treated with hydrobromic acid and crystallized from water to give (+)-3-methoxy-N-ethylmorphinan (cis) hydrobromide as crystals melting at 225 to 227° C. (decomp.). $[\alpha]_D^{25} +31.9°$ (ethanol).

*Analysis.*—Calcd. for $C_{19}H_{27}ON \cdot HBr \cdot H_2O$: C, 59.37; H, 7.87; N, 3.65. Found: C, 59.72; H, 7.87; N, 3.68.

The starting material of this example, (+)-3-methoxymorphinan (cis), is prepared from (+)-3-methoxy-4-phenyloxy-morphinan (cis) [cf. Example 1 of this specification] according to the following scheme:

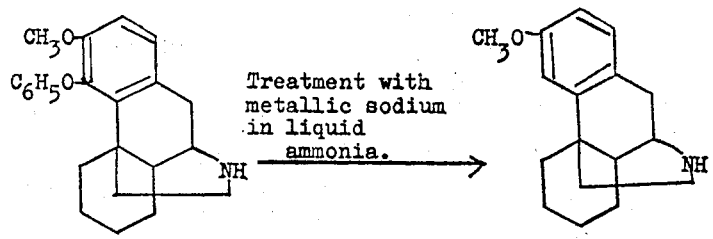

Example 4

Preparation of (+)-3-methoxy-N-phenethylmorphinan (cis):

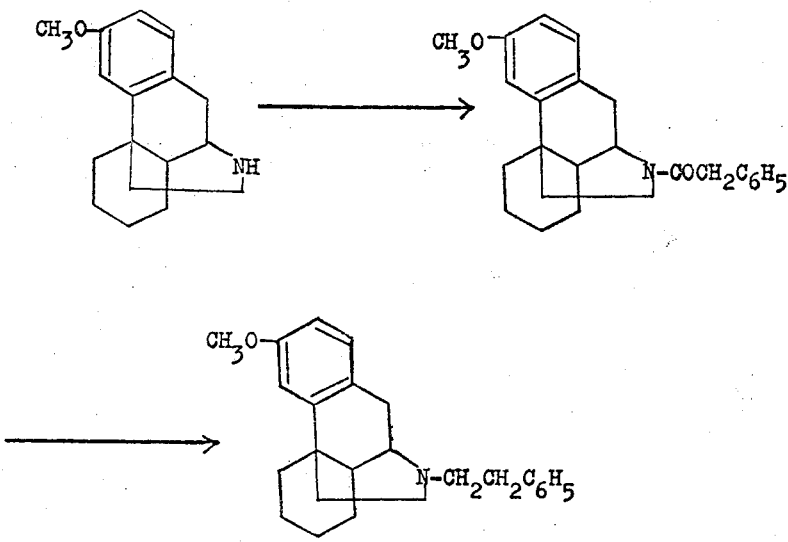

A solution of (+)-3-methoxymorphinan (cis) (4.15 g.) and phenacetyl chloride (2.5 ml.) in benzene (30 ml.) is refluxed on a water bath for 1.5 hours. The reaction mixture is washed with water, dilute hydrochloric acid and aqueous sodium hydroxide in order and chromatographed on alumina to eliminate impurities. The resultant benzene solution is evaporated to give (+)-3-methoxy-N-phenacetylmorphinan (cis) (4.87 g.) as an oil.

A solution of (+)-3-methoxy-N-phenacetylmorphinan (cis) (4.87 g.) prepared above in anhydrous ether (60 ml.) is dropwise added to a solution of lithium aluminum hydride (1.95 g.) in anhydrous ether (100 ml.), and the resultant mixture is refluxed for 5 hours. After decomposition of excess of lithium aluminum hydride with water, the ether layer is separated and shaken with dilute hydrochloric acid. The hydrochloric acid layer is made to alkalinity with sodium hydroxide and shaken with ether. The ether layer is separated and chromatographed on alumina to eliminate impurities. The resulting ether solution is evaporated to give (+)-3-methoxy-N-phenethylmorphinan (cis) (4.14 g.) as an oil. The oil is treated with oxalic acid and crystallized from hydrous ethanol to give (+)-3-methoxy-N-phenethylmorphinan (cis) oxalate as crystals melting at 204 to 205° C. (decomp.). $[\alpha]_D^{21}$ +59.1° (ethanol).

Analysis.—Calcd. for $C_{25}H_{31}ON.(COOH)_2.\tfrac{1}{2}H_2O$: C, 70.41; H, 7.44; N, 3.04. Found: C, 70.70; H, 7.33; N, 3.22.

Example 5

Preparation of (−)-3-methoxy-N-ethylmorphinan (cis):

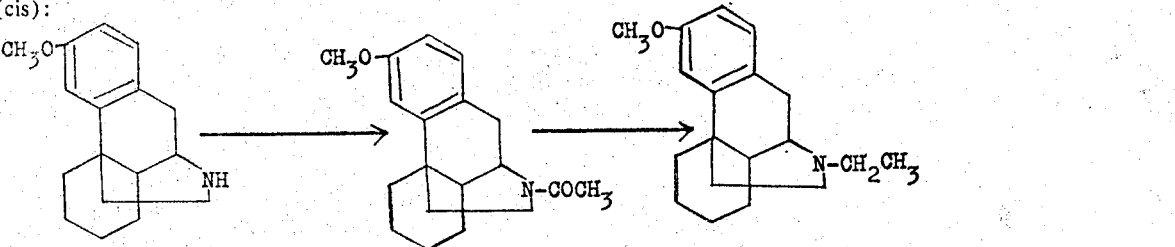

To a solution of (−)-3-methoxymorphinan (cis) (3.28 g.) in benzene (20 ml.), there is added acetic anhydride (1.7 ml.), and the resultant solution is refluxed for 1 hour. After removal of the solvent, the residue is dissolved in benzene, washed with dilute hydrochloric acid and aqueous sodium carbonate in order and evaporated to give (−)-3-methoxy-N-acetylmorphinan (cis) (3.67 g.) as an oil.

A solution of (−)-3-methoxy-N-acetylmorphinan (cis) (3.67 g.) prepared above in anhydrous ether (80 ml.) is dropwise added to a solution of lithium aluminum hydride (1.86 g.) in anhydrous ether (80 ml.), and the resultant solution is refluxed for 5 hours. After decomposition of excess of lithium aluminum hydride with aqueous sodium hydroxide, the ether layer is separated and evaporated to give (−)-3-methoxy-N-ethylmorphinan (cis) (3.25 g.) as an oil. The oil is treated with hydrobromic acid and crystallized from water to give (−)-3-methoxy-N-ethylmorphinan (cis) hydrobromide as crystals melting at 244 to 258° C. $[\alpha]_D^{20}$ −29.3° (ethanol).

The starting material of this example, (−)-3-methoxy-N-ethylmorphinan (cis), is prepared from (−)-3-methoxy-N-methylmorphinan (cis) [Sawa et al.: Tetrahedron, vol. 15, p. 154 (1961)] according to the following scheme:

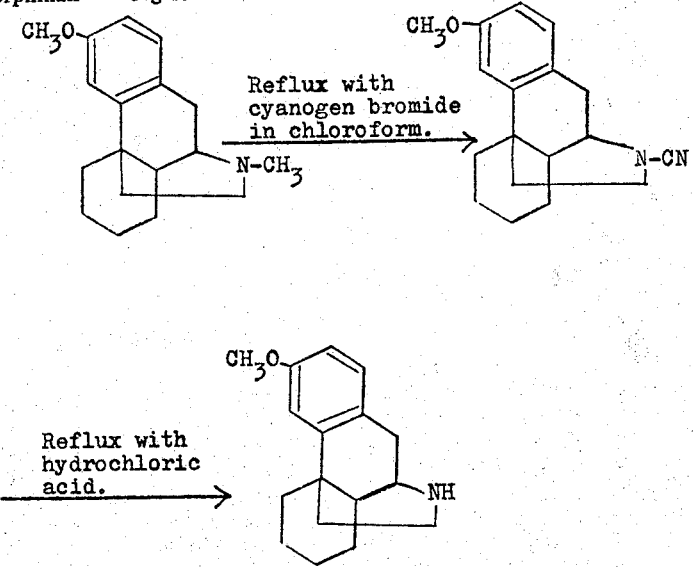

Example 6

Preparation of (−)-3-methoxy-N-phenethylmorphinan (cis):

To a solution of (−)-3-methoxymorphinan (cis) (2.97 g.) in benzene (30 ml.), there is added phenacetyl chloride (1.8 ml.), and the resultant solution is refluxed for 3 hours. The reaction mixture is washed with water, dilute hydrochloric acid and aqueous sodium hydroxide in order, dried and evaporated to give (−)-3-methoxy-N-phenacetylmorphinan (cis) (4.08 g.) as an oil.

A solution of (−)-3-methoxy-N-phenacetylmorphinan (cis) (4.08 g.) above prepared in anhydrous ether (80 ml.) is dropwise added to a suspension of lithium aluminum hydride (1.6 g.) in anhydrous ether (80 ml.) in about 20 minutes, and the resultant mixture is refluxed for 5 hours. After decomposition of excess of lithium aluminum hydride with aqueous sodium hydroxide, the ether layer is separated and evaporated to give (−)-3-methoxy-N-phenethylmorphinan (cis) (3.64 g.) as an oil. The oil is treated with tartric acid and crystallized from a mixture of isopropanol and water to give (−)-3-methoxy-N-phenethylmorphinan (cis) tartrate as crystals melting at 118 to 124° C. (decomp.) $[\alpha]_D^{20}$ −36.5° (methanol).

*Analysis.*—Calcd. for $C_{25}H_{31}ON \cdot C_4H_6O_6 \cdot 2H_2O$: C, 63.60; H, 7.55; N, 2.56. Found: C, 63.30; H, 7.51; N, 2.62.

Example 7

Preparation of (−)-3-methoxy-6-oxo-14 hydroxy-N-ethylmorphinan (cis):

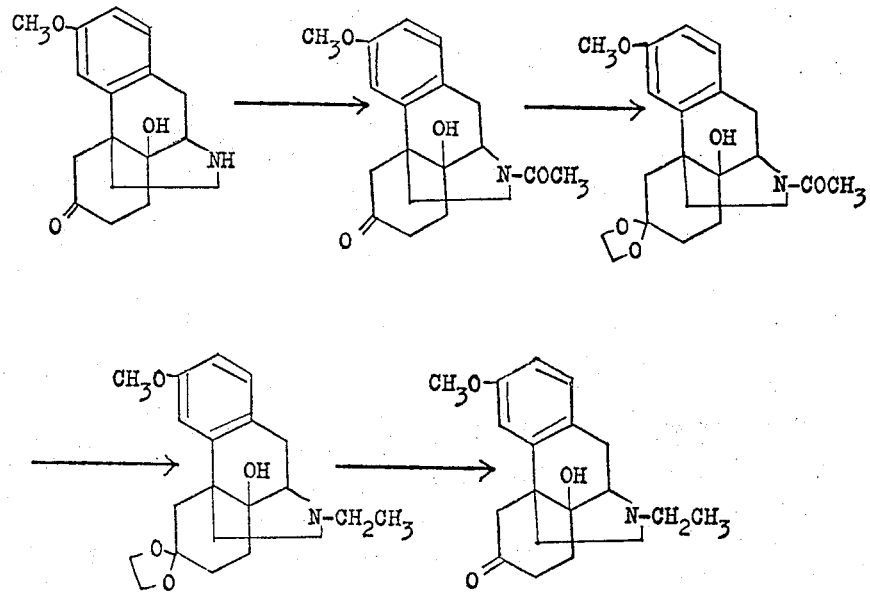

A solution of (−)-3-methoxy - 6 - oxo - 14 - hydroxy-morphinan (cis) (200 mg.) in acetic anhydride (2 ml.) is allowed to stand at room temperature (15 to 30° C.) overnight. The reaction mixture is treated in a per se conventional recovery procedure whereby the crude acetylated product (240 mg.) is obtained. The crude acetylated product is chromatographed on alumina (4 g.). The eluates with benzene - chloroform (1:1) and dichloromethane are combined together and crystallized from ethanol to give (−)-3-methoxy-6-oxo-14-hydroxy-N-acetylmorphinan (cis) (124 mg.) as crystals melting at 196 to 197° C. $[\alpha]_D^{22}$ −187° (chloroform).

*Analysis.*—Calcd. for $C_{19}H_{23}NO_4$: C, 69.28; H, 7.04; N, 4.25. Found: C, 69.54; H, 7.18; N, 4.19.

The above prepared (−)-3-methoxy-6-oxo-14-hydroxy-N-acetylmorphinan (cis) is subjected to ketalation in a per se conventional manner, i.e., the treatment with p-toluenesulfonic acid and ethylene glycol in benzene, to give (−) - 3 - methoxy-6,6-ethylenedioxy-14-hydroxy-N-acetylmorphinan (cis) (M.P. 257 to 258° C.) in a yield of 95%.

The above prepared (−)-3-methoxy-6,6-ethylenedioxy-14-hydroxy-N-acetylmorphinan (cis) (600 mg.) is combined with tetrahydrofuran (70 ml.) and lithium aluminum hydride (500 mg.) and stirred for 6 hours at room temperature (15 to 30° C.) The reaction mixture is treated in a per se conventional recovery procedure and crystallized from ethanol to give (−)-3-methoxy-6,6-ethylenedioxy-14-hydroxy-N-ethylmorphinan (cis) (535 mg.) as crystals melting at 139.5 to 140.5° C. $[\alpha]_D^{24}$ −70.0° (chloroform).

*Analysis.*—Calcd. for $C_{21}H_{19}NO_4$: C, 70.17; H, 8.13; N, 3.90. Found: C, 69.82; H, 8.16; N, 3.71.

The above prepared (−)-3-methoxy-6,6-ethylenedioxy-14-hydroxy-N-ethylmorphinan (cis) (440 mg.) is combined with N hydrochloric acid (5 ml.) and heated on a water bath for 10 minutes. The reaction mixture is neutralized with ammonia water and shaken with dichloromethane. The dichloromethane extract is evaporated and crystallized from ethanol to give (−)-3-methoxy-6-oxo-14-hydroxy-N-ethylmorphinan (cis) (380 mg.) as crystals melting at 188.5 to 189.5° C. $[\alpha]_D^{24}$ −116.0° (chloroform).

The starting material of this example, (−)-3-methoxy-6-oxo-14-hydroxymorphinan (cis), is prepared from (−)-3-methoxy-4,14 - dihydroxy-6-oxo-N-methylmorphinan [Speyer et al.: Ann., vol. 430, p. 1 (1923)] according to the following scheme:

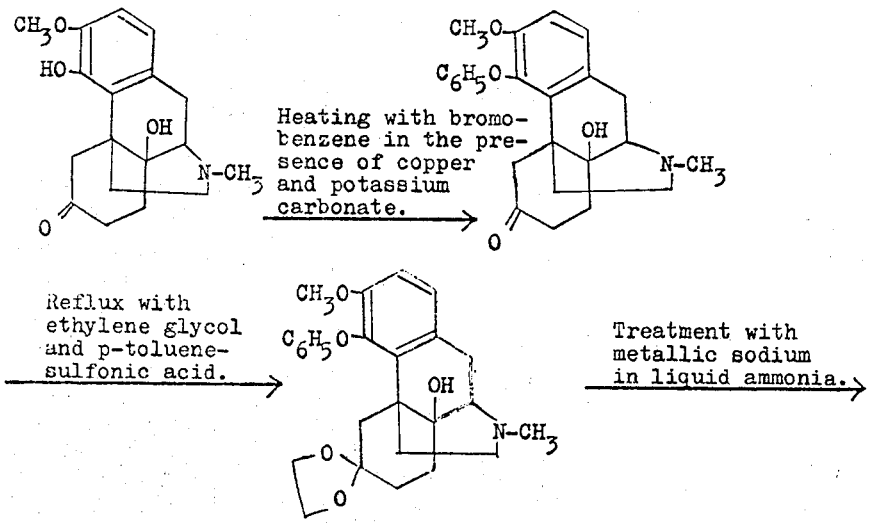

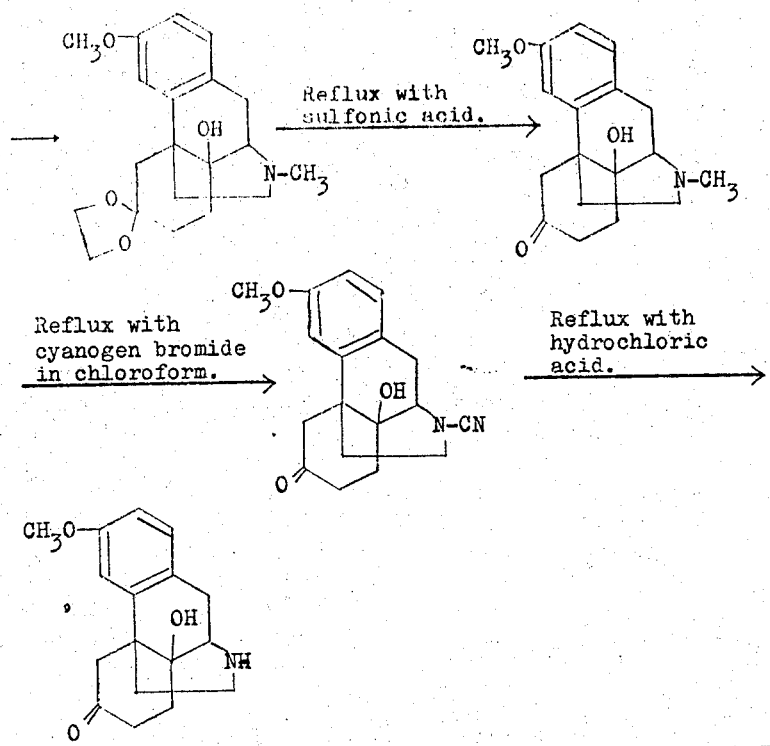

What is claimed is:
1. 3-lower alkoxy-4-phenyloxy - N - lower alkanoyl-morphinan.
2. (+)-3-methoxy-4-phenyloxy - N - acetylmorphinan (cis).
3. 3-lower alkoxy-N-lower alkanoylmorphinan.
4. (+)-3-methoxy-N-acetylmorphinan (cis).
5. (−)-3-methoxy-N-acetylmorphinan (cis).
6. 3-lower alkoxy-6-oxo-14-hydroxy-N-lower alkanoyl-morphinan.
7. (−)-3-methoxy-6-oxo-14-hydroxy - N - acetylmorphinan (cis).

References Cited by the Examiner

UNITED STATES PATENTS

| | | |
|---|---|---|
| 2,885,401 | 5/59 | Grussner et al. _____ 260—285 |
| 3,085,091 | 4/63 | Sawa et al. _____ 260—285 |

FOREIGN PATENTS 765,920   1/57   Great Britain.

OTHER REFERENCES

Hartung, Ind. and Eng. Chem., vol. 37, pages 126–27 (1945).

NICHOLAS S. RIZZO, *Primary Examiner.*